United States Patent [19]

Righi

[11] Patent Number: 5,163,620

[45] Date of Patent: Nov. 17, 1992

[54] NOZZLE FOR SUPERCONDUCTING FIBER PRODUCTION

[75] Inventor: Jamal Righi, North Canton, Ohio

[73] Assignee: The Babcock and Wilcox Company, New Orleans, La.

[21] Appl. No.: 855,141

[22] Filed: Mar. 20, 1992

Related U.S. Application Data

[63] Continuation of Ser. No. 648,462, Jan. 31, 1991, abandoned.

[51] Int. Cl.$^5$ .............................................. B22D 11/01
[52] U.S. Cl. ........................................ 239/290; 425/7; 264/12
[58] Field of Search ................... 239/434.5, 432, 290, 239/300; 425/7, 6; 264/112

[56] References Cited

U.S. PATENT DOCUMENTS

| | | | |
|---|---|---|---|
| 1,769,181 | 7/1930 | Jackson | 425/7 |
| 1,834,687 | 12/1931 | Davis | 425/7 |
| 2,048,651 | 7/1936 | Norton | 425/7 |
| 2,774,630 | 12/1956 | Henry et al. | 239/434.5 |
| 3,283,039 | 11/1966 | Walz et al. | 425/7 |
| 3,951,870 | 4/1976 | Economy et al. | 252/506 |
| 4,066,117 | 1/1978 | Clark et al. | 239/290 |
| 4,078,747 | 3/1978 | Minovitch | 244/159 |
| 4,299,861 | 11/1981 | Dietrich et al. | 427/62 |
| 4,378,330 | 3/1983 | Verhoeven et al. | 420/432 |
| 4,414,184 | 11/1983 | Pinkston | 239/434.5 |
| 4,464,413 | 8/1984 | Murphy et al. | 427/6 |
| 4,676,815 | 6/1987 | Wagner et al. | 425/7 |
| 4,822,267 | 4/1989 | Walz | 425/7 |
| 4,828,469 | 5/1989 | Righi | 425/7 |
| 4,861,751 | 8/1989 | Tenhover | 505/1 |
| 4,866,031 | 9/1989 | Bolt et al. | 505/1 |
| 4,891,249 | 1/1990 | McIntyre | 239/300 |
| 4,902,992 | 2/1990 | Rubin et al. | 333/126 |
| 4,939,308 | 7/1990 | Maxfield et al. | 505/1 |
| 4,939,976 | 7/1990 | Minovitch | 89/8 |

OTHER PUBLICATIONS

T. A. Miller, et al., "Crystallization of Amorphous Bi Cuprate Fibers to Super Conducting $Bi_2Sr_2Ca,Cu_2O_8$", Applied Physics Letters, 56(6), 5 Feb. 1990, pp. 584–586.

S. E. LeBeau et al., "Preparation of Superconducting Bi—Sr—Ca—Cu—O Fibers", Appl. Phys. Lett., 55(3), 17 Jul. 1989, pp. 292–294.

J. Righi et al., "Gas Jet Fiberization of $Bi_2Sr_2Ca,Cu_2O_8$", TMS Conference, Ainaheim, CA, Feb. 1990.

A. Davidson et al., "Reminant Resistance in Tsuei's Composite Superconductors", IEEE Trans. Magn., vol. MAG-11, No. 2, Mar. 1975, pp. 276–279.

T. A. Miller et al., "Microfilamentary $Bi_2Sr_2Ca,Cu_2O_8$ Fibers", International Conference on Superconductivity, Bangalore, India, 1990.

S. A. Krzeczkowski, "Measurement of Liquid Droplet Disintegration Mechanisms", Int. J. Multiphase Flow, vol. 6, pp. 227–239, 1980.

B. J. Azzopardi and P. Hutchinson, "The Disintegration of Liquid Droplets", HTFS, RS504, Jun. 1983, pp. 526–539.

S. Everding and B. Kumar, "Preparation of $YBa_2Cu_3O_{7-x}$ High-$T_c$ Ceramic Superconducters from Melt," Journal of Superconductivity, vol. 2, pp. 281–291, 1989.

Primary Examiner—Andres Kashnikow
Assistant Examiner—Christopher G. Trainor
Attorney, Agent, or Firm—Vytas R. Matas; Robert J. Edwards; Daniel S. Kalka

[57] ABSTRACT

A nozzle apparatus for producing flexible fibers of superconducting material receives melted material from a crucible for containing a charge of the superconducting material. The material is melted in the crucible and falls in a stream through a bottom hole in the crucible. The stream falls through a protecting collar which maintains the stream at high temperatures. The stream is then supplied through the downwardly directed nozzle where it is subjected to a high velocity air flow which breaks the melted superconducting material into ligaments which solidify into the flexible fibers. The fibers are collected by blowing them against a porous cloth.

11 Claims, 4 Drawing Sheets

FLOW DIRECTION →

NOZZLE FOR SUPERCONDUCTING FIBER PRODUCTION

This invention was made with government support under a contract with the Department of Energy (DOE) and Ames Laboratory, Contract No. SC-89-174, our Reference No. CRD-1234. The government has certain rights in this invention.

This is a continuation of application Ser. No. 07/648,462 filed Jan. 31, 1991 now abandoned.

FIELD AND BACKGROUND OF THE INVENTION

The present invention relates in general to superconducting material, an in particular to a new and useful method and apparatus of producing elongated flexible fibers from such material.

U.S. Pat. Nos. 4,299,861 and 4,078,747 produce flexible superconductor fibers by providing a superconducting layer on a carbon fiber. U.S. Pat. No. 4,861,751 is similar in that the superconductor is formed as a sheath of superconducting oxide exterior to a core of amorphous metal alloy. U.S. Pat. No. 3,951,870 also relates to preparing a flexible superconductor fiber by the chemical conversion of a precursor carbon fiber by the high temperature reaction of a carbon yarn with a transition metal such as $NbCl_5$, $H_2$, $N_2$. U.S. Pat. No. 4,378,330 discloses a process for preparing a composite superconducting wire to form a plurality of very fine ductile superconductors in a ductile copper matrix. U.S. Pat. NO. 4,939,308 discloses an electrodeposition method for forming a superconducting ceramic. U.S. Pat. NO. 4,866,031 discloses a process for making 90° K. superconductors from acetate precursor solutions.

None of these references, however, addresses the problem of fiber brittleness where the fiber is of superconducting material only.

U.S. Pat. No. 4,828,469 to one of the coinventors here, and which is owned by the assignee of the present application, discloses an improved nozzle for the production of alumina-silica ceramic fibers. The superconducting fibers produced with this nozzle are extremely brittle.

Also, see the article entitled "Preparation of Superconducting Bi-Sr-Ca-Cu-O Fibers" by LeBeau et al., *Appl. Phys. Lett.*, 55 (3) 17 July 1989, which discloses long slender fibers of superconducting Bi compounds but which lacks the specific disclosure of the present application for creating these fibers.

Major advances have been made in the development of high-temperature superconductor (HTSC) materials based on copper-bearing oxides such as $Y_1Ba_2Cu_3O_7$ and $Bi_2Sr_2Ca_1Cu_2O_x$. These and other raw materials have been processed using a wide variety of techniques in an attempt to produce useful engineering devices. Some of the processing techniques used include plasma spraying, sputtering, sol-gel, laser pedestal growth, wire and strip manufacturing and fiberization. In the plasma spraying and sputtering methods, the HTSC material is deposited on a substrate to produce a thin film. In the laser-heated pedestal growth method, the HTSC powder is pressed into pellets and sintered and small rods are cut from the pellets. A laser is used to melt the top of the rod and a seed crystal is placed in the melt. The wire is grown by withdrawing the seed at a controlled rate between 1.5 and 50 mm/hr. This method is extremely slow and therefore does not lend itself to becoming a good technique for mass production. In the fiberization method, Bismuth based compounds were melted and fiberized using a gas jet. Fibers typically 100 μm to 200 μm in diameter and 5 mm to 10 mm in length were produced using the nozzle of U.S. Pat. No. 4,828,465. The fibers were very brittle and did not have a large length-to-diameter ratio, however. Small pieces of thin film, strip, tape and wire have been produced from the superconducting materials. However, methods and apparatus still need to be developed to put the small pieces of wire and tape into commercially-useful HTSC devices. These materials are not produced in bulk quantities and continue to suffer from the problems of brittleness, which are hampering the transfer of production from the laboratory to industry.

SUMMARY OF THE INVENTION

A main object of the present invention is to provide high-temperature superconducting (HTSC) fibers with better mechanical properties (flexibility) than currently available. The flexibility makes these fibers more useful in producing multi-filamentary superconducting composite wires which can be used in many commercial applications. The composite superconducting wires require fibers with diameters on the order of a few microns and length-to-diameter ratios in the range of 1,000 to 10,000. The fine fibers produced from HTSC materials are incorporated into a normal metal matrix to form the composite multi-filamentary conductor. Davidson, Tinkham and Beasley (IEEE Trans. Magn. MAG-11, 276, 1975) have shown that the effective conductivity of such a superconductor-normal metal composite is increased over the normal metal conductivity by the square of the length-to-diameter ratio of the fibers, $[\sigma \sim 1/d^2]$. This means that a composite of superconducting filaments 1 cm long and 10 μm in diameter embedded in a copper matrix will give a conductivity one million times greater than that of copper alone. If, in addition, there is a significant proximity effect, in which superconductivity is induced in the copper matrix, true supercurrents will flow. The goal here is to develop a process for the preparation of long slender fibers of the high temperature superconductors for use in those composites.

Accordingly, another object of the present invention is to provide a method of producing flexible fibers of superconducting material, comprising: melting a superconducting material; dropping a stream of the melted superconducting material into a vertically extending barrel; blowing gas downwardly through the barrel at a sufficient rate to transform the melted superconducting material in the barrel, into fine ligaments which cool and solidify in the barrel to form flexible fibers; and collecting the flexible fibers.

A further object of the present invention is to provide an apparatus for producing flexible fibers of superconducting material which comprises a nozzle of special construction and design which has been found to be critical for producing the flexible superconducting fibers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
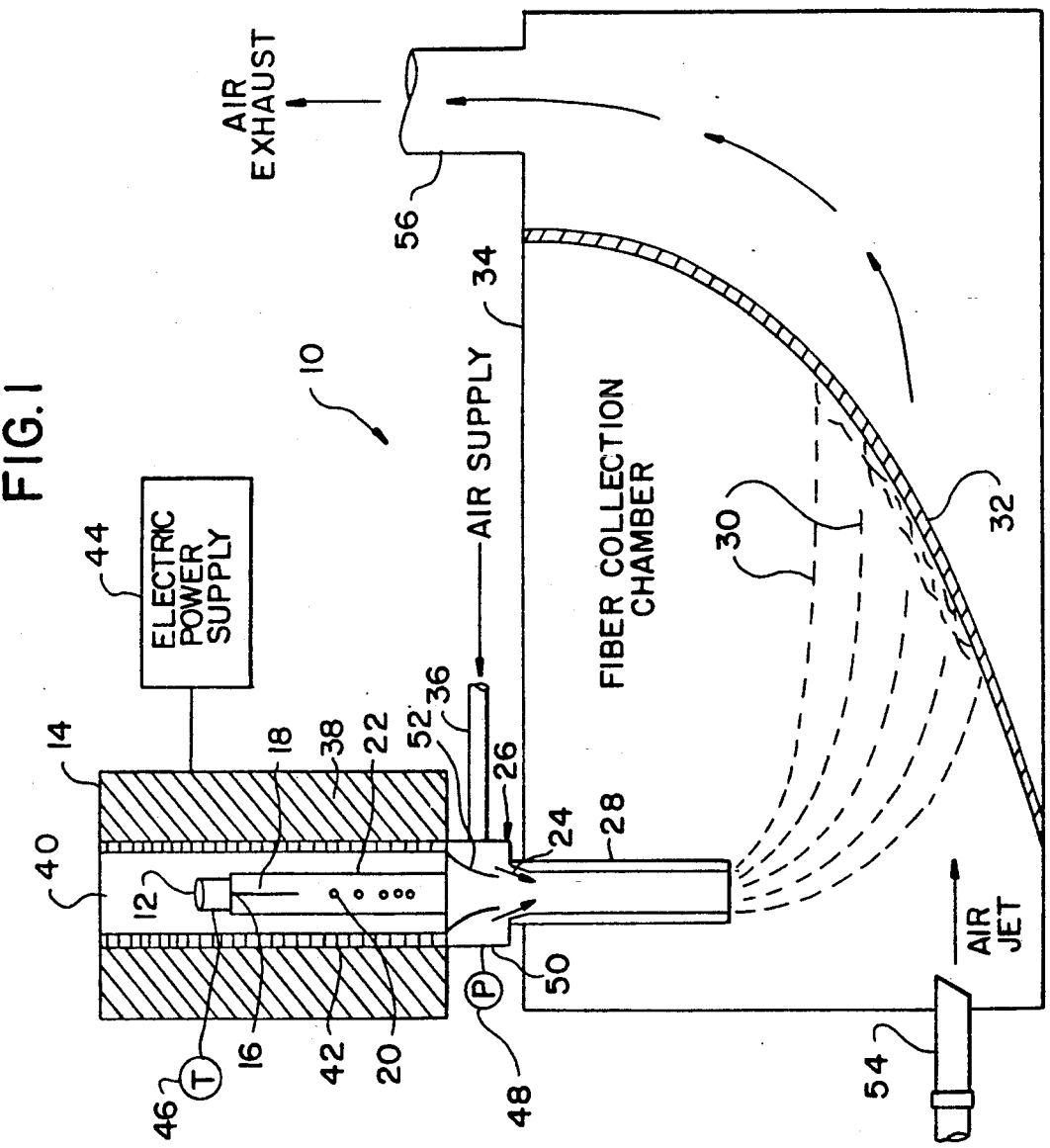
FIG. 1 is a schematic sectional view of an apparatus constructed in accordance with the present invention, for practicing the method of the present invention.

Referring to the drawings in particular, the invention embodied in FIG. 1 comprises an apparatus generally designated 10 for producing flexible fibers of superconductor material 30, in accordance with the method of the present invention.

$Bi_2Sr_2Ca_1Cu_2O_x$ (Bi 2212) high-temperature superconducting material in powder form is melted in an alumina crucible 12 using an electric furnace 14 of the apparatus 10. The Bi 2212 melts completely at 1650° F. (phase change). The melt, however, is superheated to 1720°–1740° F. to reduce its viscosity. Once the melt is well established, it flows freely at 18 from a small hole 16 at the bottom of the alumina crucible 12. The melt forms a continuous stream which might break up into separate droplets at 20. The melt falls through a high-temperature ceramic collar 22 in the furnace, which is used to stabilize the melt stream and prevent it from wavering. The molten stream is then subjected to a high velocity fiberizing air stream 24 inside a blowing nozzle 26 mounted in the vertical direction. The high velocity air generates enormous shearing rates on the surface of the molten stream which transform the Bi 2212 melt into fine ligaments. The ligaments in the molten/glassy state undergo further shearing and cooling inside a barrel 28 of the nozzle 26. The filaments become long and thin and reach complete solidification producing fibers 30. Some of the melt produces small flakes and nearly spherical shot. The blown material is collected downstream on a porous cloth 32 in a vented collecting chamber 34. The blowing nozzle 26 is a modification of the nozzle in U.S. Pat. No. 4,828,469. The modified nozzle is here designed specifically to accommodate the thermal and fluid characteristics of the Bismuth-based superconductor melts; namely, to match the viscous behavior and cooling characteristics of these melts. Furthermore, the new nozzle is designed to bring the high velocity shear layer in close proximity of the droplets so that fine fibers are stripped from the melted superconducting material. The objective of the modified nozzle is to obtain thin fibers with length-to-diameter ratios in the range of 1,000 to 10,000. The produced fiber is very flexible and ranged in diameter from 1 to 10 microns ($\mu$m) with lengths of about 25 to 50 millimeters. The nozzle is operated at supersonic speeds and with an air supply 36 sufficient to produce pressures between 10 and 20 psig for best results.

The present invention addresses one of the major obstacles facing the development of high-temperature superconductors; namely, the problem of brittleness. Most of the materials produced from HTSC powders exhibit poor mechanical properties and therefore cannot be used reliably in commercially-useful devices. In addition, these materials have only been produced in simple shapes, such as small pieces of wire, tape and thin film and methods of mass production are still lacking. The flexible fibers of the invention can reliably be made on a mass production basis using the gas jet blowing technique.

The major advantages of the present invention are that: the fibers formed from the HTSC material are very flexible which permits the formation of rope and other forms of fiber bundles which can be flexibly shaped into useful applications, such as for motors, generators, transformers, magnets, power lines, levitated trains and medical imaging systems.

Long slender fibers are an attractive shape for a superconducting material because they can be combined into a superconducting-normal metal composite having an enormous overlap area for current transfer between fibers. Also the 1–10 micron ($\mu$m) diameters and length-to-diameter ratios of 1,000 to 10,000 of these fibers are ideal for the development of multi-filamentary superconducting wire.

Although the present invention has been described in terms of the Bismuth 2212 HTSC material, fibers can also be produced from the Bismuth 1112, lead-bearing bismuth compounds and other non-bismuth-based materials. Newly-developed and existing superconducting material could also be suitable candidates for the production of flexible fibers as long as they possess the appropriate thermal and fluid properties for good fiberization.

Returning now to FIG. 1, the apparatus 10 includes an insulated sleeve of high temperature refractory material 38 which contains a central passage 40 in which the crucible 12 and collar 22 are positioned. This chamber is surrounded by a heating coil 42 which is connected to an electric power supply 44, for heating the crucible and collar to the melting temperatures of the material in the crucible and above.

A temperature sensor 46 is advantageously connected to the crucible 22 for sensing the temperature of the crucible, and a pressure sensor 48 is connected to an inlet chamber 50 of the nozzle 26. A converging deflector or disc 52 is positioned within inlet chamber 50 for deflecting the air supply 36 downwardly in the direction of flow 24, for transforming the stream droplets 20 into ligaments which solidify in the barrel 28 and form fibers 30.

A collecting air or gas supply line 54 also directs air or other gas against the collecting cloth 32. This air is vented from the collecting chamber 34 through an exhaust 56.

In practicing the present invention, it was found that the temperature of the superconducting material in the crucible must be raised up to 100° above its melting point to ensure that the melt is sufficiently fluid to flow through the opening in the crucible 12. Only after the higher temperature range was reached, was a plug (not shown) in the opening 16 removed to initiate the stream 18.

It was also important to investigate droplet formation. There are several distinct mechanisms for droplet breakup depending on the value of the Weber number (We) and LaPlace number (La) which are expressed by $$We = (\rho_1 U^2 D)/\sigma \qquad \qquad 1)$$

$$1/La = \mu^2/\sigma\rho D \qquad 2)$$

where $\rho_a$ is the air density, U is the local air velocity, $\sigma$ is surface tension, $\rho$ is melt density, $\mu$ is melt viscosity and D is the diameter of the undisturbed droplet. The Weber number is the ratio of the aerodynamic force to the droplet surface tension and the inverse LaPlace number is the ratio of the viscous force to the surface tension force on the droplet.

Figure 2:
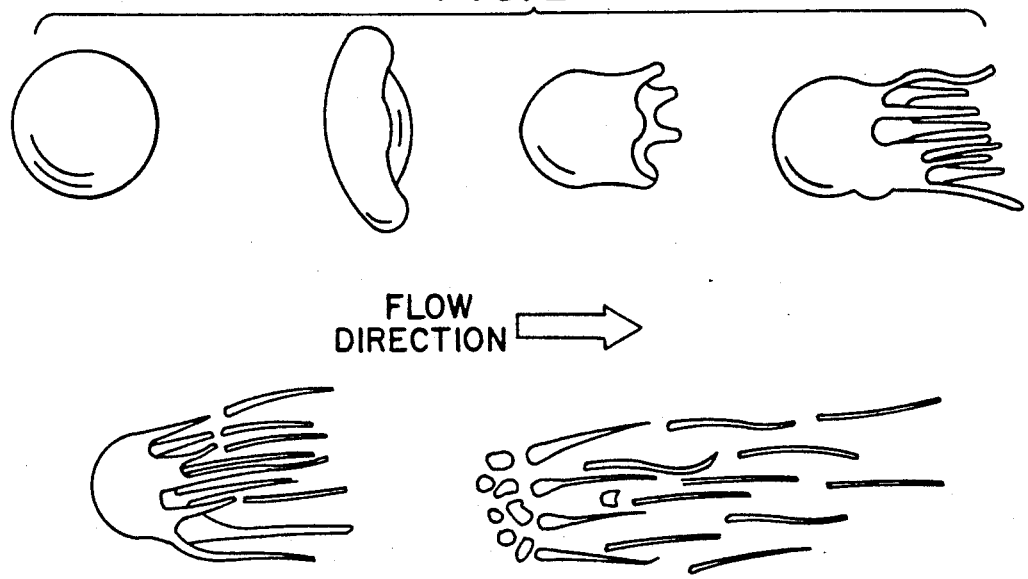
FIG. 2 is a time elapse, composite view of how a droplet deforms under the influence of the gas stream in a barrel of the blowing nozzle.
Figure 3:
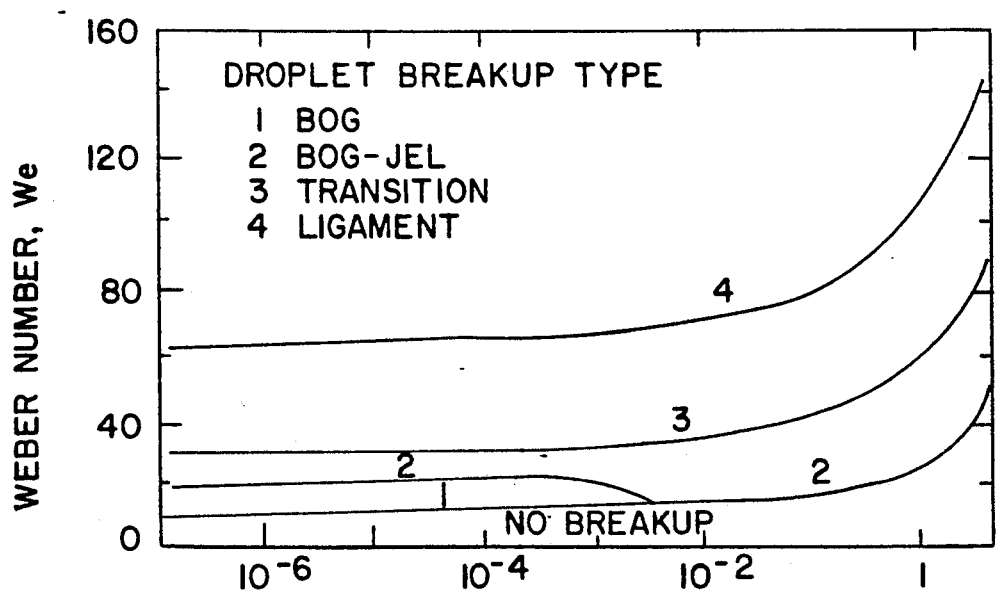
FIG. 3 is a graph plotting, the inverse of the LaPlace number against the Weber number for droplet breakup mechanisms.

The manner in which liquid droplets disintegrate is found to depend on the range of the Weber number as shown in FIG. 3. For Weber numbers under about 10 there is no breakup; between about 10 and 25 there is a bag mode; between 25 and 50 there is an umbrella mode; between 50 and about 1000 there is a stripping of ligaments from the periphery of the deformed droplet; above 1000, atomization begins. Ligament type breakup is desirable for fiber production because it yields more fibers and less shot. FIG. 2 shows the ligament mode breakup. For this reason, the liquid does not solidify until the last stage where filaments and shot of the high temperature superconductor are formed. For 1/La less than 0.01, ligament formation and fiberization requires a Weber number in the range of 70, and the effect of the LaPlace number was found experimentally to be small as shown in FIG. 3. For inverse LaPlace numbers greater than 0.01, the Weber number must be somewhat larger to achieve fiberization.

According to the invention, in addition to reducing the viscosity of the melted superconducting material, down to about 1 poise at the superheated level, it is also important to utilize a nozzle 26 of particular dimensions and design which have been found by the inventors to be critical.

Figure 4:
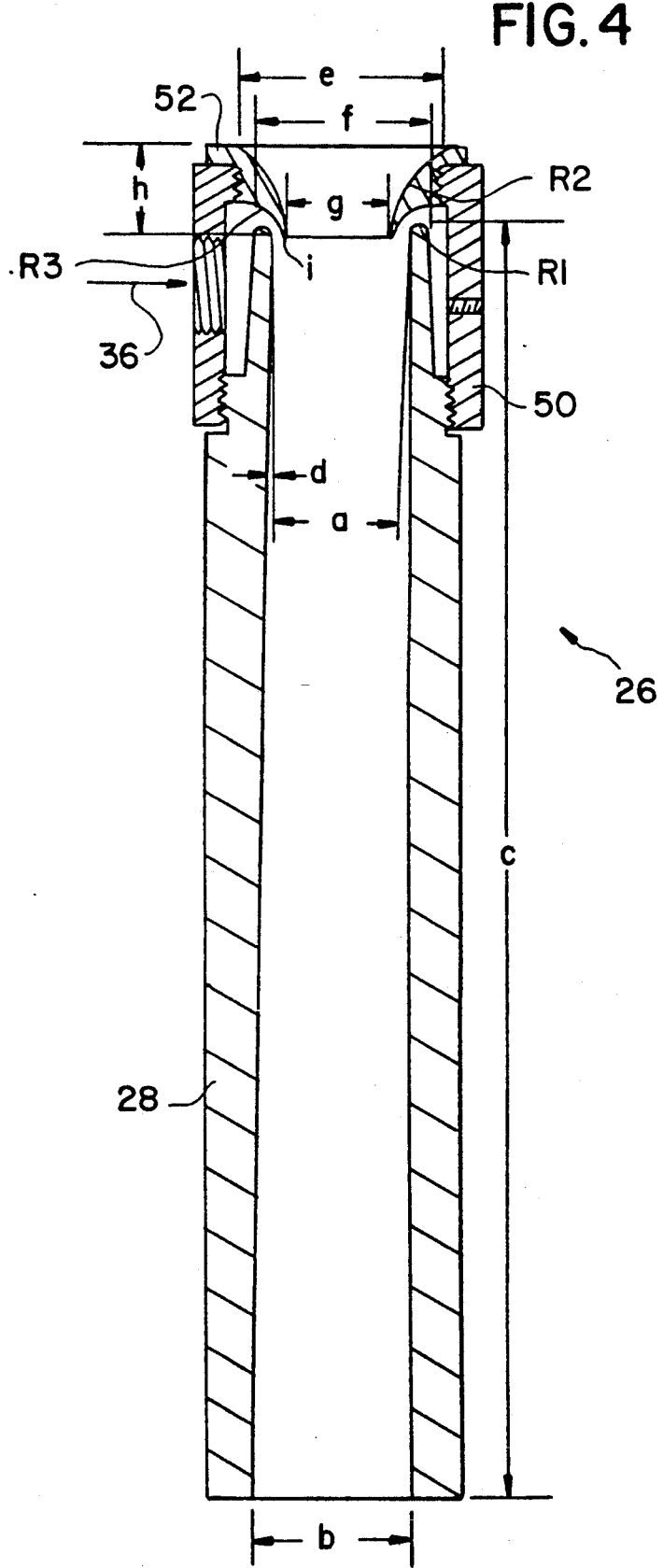
FIG. 4 is a sectional view of the nozzle constructed in accordance with the present invention.
Figure 5:
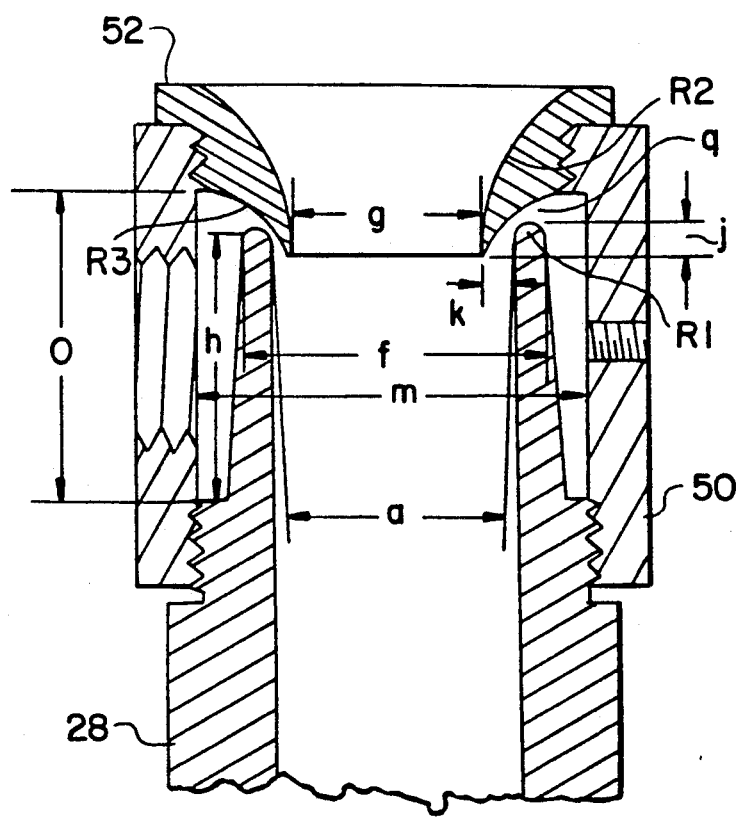
FIG. 5 is a partial sectional view of the nozzle, on an enlarged scale.

Referring now to FIGS. 4 and 5, nozzle 26 is structurally similar to the nozzle disclosed in U.S. Pat. No. 4,828,469, which was mentioned above, however the inventors have found that a careful selection of the relative dimensions and positions for the elements of the nozzle are critical to forming superconducting fibers that are flexible and which also have the desired length-to-diameter ratio. The nozzle is designed specifically to accommodate the thermal and fluid characteristics of the Bismuth-based superconductor melts, namely to match the viscous behavior and cooling characteristic of these melts. The Bismuth-based and other high temperature superconductor materials have a relatively narrow fiberization temperature window due to the sharp change of melt viscosity with temperature compared to glasses and alumina-silica melts. Therefore, the nozzle of the present invention is placed in the vertical direction immediately beneath the furnace to prevent the melt stream/droplets from cooling before they reach the blowing nozzle 26.

Furthermore, the nozzle of the present invention is designed to bring the high velocity shear layer of air in close proximity to the droplets so that fine fibers are stripped from the melted superconducting material as illustrated in FIG. 2.

Returning now to FIGS. 4 and 5, the various dimensions which are illustrated in the Figures have been found to have the following optimum values, for making flexible fibers of superconducting material having the desired characteristics setforth in this disclosure:

| | |
|---|---|
| Barrell inside inlet diameter | a = 1.25" |
| Barrell inside outlet diameter | b = 1.60" |
| Barrell length | c = 13.80" |
| Barrell bore taper angle | d = 0.73° |
| Disc inside inlet diameter | e = 2.00" |
| Barrel outside inlet diameter | f = 1.61" |
| Disc inside outlet diameter | g = 1.102" |
| Disc axial length | h = 0.844" |
| Disc minimum annular outlet thickness | i = 0.040" |
| Axial overlap between disc and barrel | j = 0.140" |
| Radial annular gap between disc outlet and barrel | k = 0.034" |
| Air chamber inside diameter | m = 2.09" |
| Axial length of barrel in air chamber | n = 1.67" |
| Chamber axial length | o = 1.82" |
| Minimum annular gap between disc and barrel | q = 0.02" |
| Radius of barrel inlet end | R1 = 0.09" |
| Disc inlet passage radius | R2 = 1.50" |
| Disc outside radius | R3 = 0.344" |

Of these measurements, the most critical is the minimum annular gap q of about 0.02" which has been found to be particularly instrumental in achieving the fibers of the desired characteristics. The other dimensions are also important.

While a specific embodiment of the invention has been shown and described in detail to illustrate the application of the principles of the invention, it will be understood that the invention may be embodied otherwise without departing from such principles.

What is claimed is:

1. A nozzle for producing flexible fibers of high temperature superconducting material, comprising:
   a deflector disc having a passage therethrough with an inlet end for receiving melted superconducting material from a crucible, and an outlet end, said passage decreasing smoothly and continuously from said inlet end to said outlet end;
   a barrel having an inlet end extending around the outlet end of said disc and defining an annular gap of about 0.02" between said disc and the inlet end of said barrel; and
   a housing around said disc and around the inlet end of said barrel defining an air chamber around the inlet end of said barrel for receiving air which passes through said annular gap into said barrel, said housing being positioned immediately beneath a furnace containing the crucible so as to place said inlet end of said deflector disc vertically beneath the crucible to prevent the melted superconducting material from cooling when it passes therethrough, wherein the nozzle receives the melted superconducting material to produce flexible superconducting fibers having diameters of from about 1 to 10 microns and length-to-diameter ratios of from about 1,000 to 10,000.

2. A nozzle according to claim 1, wherein the outlet end of said disc axially overlaps the inlet end of said barrel by about 0.140".

3. A nozzle according to claim 2, wherein the outlet end of said disc radially overlaps the inlet end of said barrel by about 0.034".

4. A nozzle according to claim 1, wherein said inlet end of said deflector disc has a diameter of about 2 inches.

5. A nozzle according to claim 1, wherein said outlet end of said deflector disc has a diameter of about 1.102 inches.

6. A nozzle according to claim 1, wherein said inlet end of said barrel has a diameter of about 1.25 inches.

7. A nozzle according to claim 1, wherein said barrel further comprises an outlet end having a diameter of about 1.60 inches.

8. A nozzle according to claim 1, wherein said barrel has a length of about 13.80 inches.

9. A nozzle according to claim 1, wherein said barrel further comprises a bore having a taper angle of about 0.73°.

10. A nozzle according to claim 1, wherein said deflector disc includes a bore being defined by a continuous circumferential surface having a radius in axial cross-section of about 1.50 inches.

11. A nozzle according to claim 1, further comprising an air supply for supplying air to the air chamber around the inlet end of said barrel to produce a pressure between about 10 and 20 psig.

* * * * *